Figure 1:
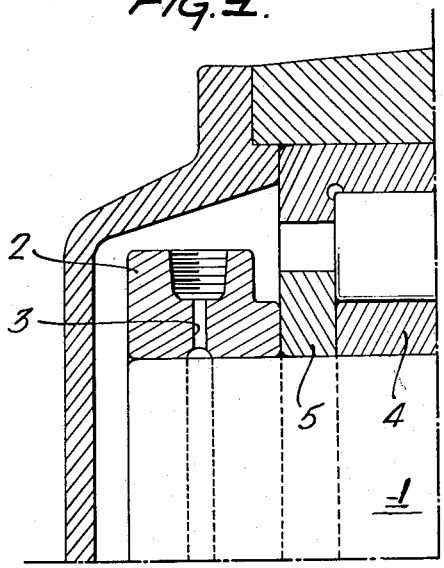

June 5, 1956　　　　F. KORT　　　　2,749,192
METHOD AND MEANS FOR AXIALLY FIXING ROLLING BEARINGS
Filed Jan. 21, 1953　　　　2 Sheets-Sheet 1

Inventor:
Fritz Kort
by his Attorneys
Howson & Howson

June 5, 1956   F. KORT   2,749,192
METHOD AND MEANS FOR AXIALLY FIXING ROLLING BEARINGS
Filed Jan. 21, 1953   2 Sheets-Sheet 2

Inventor:
Fritz Kort
by his Attorneys
Howson & Howson

United States Patent Office 2,749,192
Patented June 5, 1956

2,749,192

METHOD AND MEANS FOR AXIALLY FIXING ROLLING BEARINGS

Fritz Kort, Schweinfurt, Germany, assignor, by mesne assignments, to SKF Industries, Inc., Philadelphia, Pa., a corporation of Delaware Application January 21, 1953, Serial No. 332,490

Claims priority, application Germany January 25, 1952

4 Claims. (Cl. 308—236)

Hitherto the usual manner of fixing rolling bearings subjected to heavy thrust forces, especially heavy axial shocks, has almost invariably been through heavy nuts or screws with dependable locking means, through which the bearing has been held and clamped. Apart from the fact that this method of fixing the bearing is expensive it can in many cases not be used, since for example, it may not be possible to cut threads in the shaft. In such cases, a circular groove is often formed in the shaft, in which is located a split threaded ring. This however, means further increase in cost and the resultant weakening of the shaft is not always permissible.

It has been previously suggested to fix rolling bearings axially by means of a shrink-ring. This means has, however, been applied only for bearings which are not subjected to thrust or are subjected to very little thrust. Further, upon removing the fixing means, the engaging surfaces have been so badly damaged, that repeated use has not been possible, or has at least been problematic, or in other cases, it has been necessary to cut through the shrink-ring to enable it to be removed.

Further, it has been previously suggested to remove a machine part shrunk onto a shaft by forcing oil under pressure into the joint to form an oil film between the engaging surfaces and thus, wholly or partially relieve the metallic contact between the members of the joint.

By the combination of the two methods described above, it is possible to use instead of threads, nuts, screws, keys and locking devices for the same, a shrink-ring for axially fixing rolling bearings subjected to heavy thrust loads. These rings can be mounted and removed as often as required, without damaging or destroying any of the parts. The invention, thus provides a new, very simple and very safe means for fixing rolling bearings, which is very economical in use.

According to some forms of the invention, the fixing means can be so formed that the shrink-ring replaces certain parts of the rolling bearing. In cylindrical roller bearings for instance, a loose guide flange of the usual type may be replaced by the shrink-ring serving to fix the bearing. In addition to the simplification and lowering of costs which results from this device, a further considerable advantage is obtained. Since a shrink-ring upon cooling also shrinks in breadth, a loose guide flange of the usual type on the bearing can as a rule not be fixed by means of a shrink-ring. The loose guide flange therefore, is carried along by the rollers and rotates on the shaft. Thus, wear takes place between the guide ring and the shaft, which later leads to serious damage. This is avoided, if the shrink-ring is so shaped that it also serves as a guide ring. The surface of the shrink-ring engaged by the ends of the rollers should preferably be hardened.

The shaft and the shrink-ring are so dimensioned relative each other that the shrunk joint is capable of withstanding the greatest stresses to which it could be subjected and the material of which it is made is chosen so that the limit of elastic elongation is not exceeded.

For removing the shrink-ring, oil is introduced into the joint in a known manner through a channel, the said oil being of such pressure that it forms an oil film between the engaging surfaces of the joint and wholly or partially relieves the metallic contact between the ring and the shaft. The ring can then easily be removed. The force required to withdraw the ring is only a few percent of the thrust force which the ring is otherwise able to withstand. The ring can be mounted and removed as often as required without in any way damaging the surfaces of the shaft, the ring or the bearing. Only a short time is required to mount or remove the ring and the special apparatus required can be used universally for other designs of the same or similar type.

Figure 2:
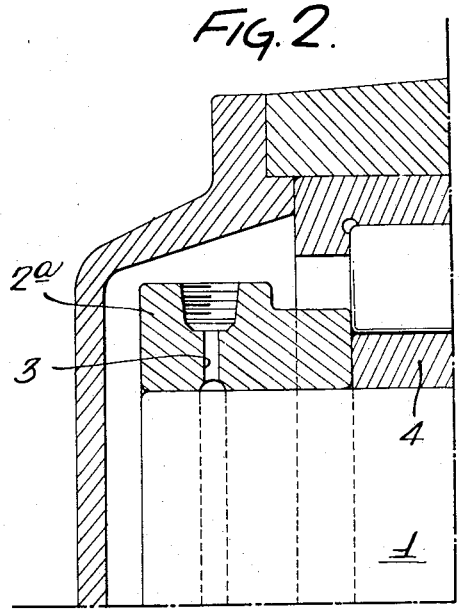

Several forms of the invention are illustrated in the accompanying drawings. Fig. 1 is a sectional view of a device for axially fixing a rolling bearing by a shrink-ring. Fig. 2 is a sectional view showing a similar device, in which however, the shrink-ring is formed to replace a loose guide ring. Figs. 3 to 6 inclusive are similar views illustrating modifications within the scope of the invention.

Figure 3:
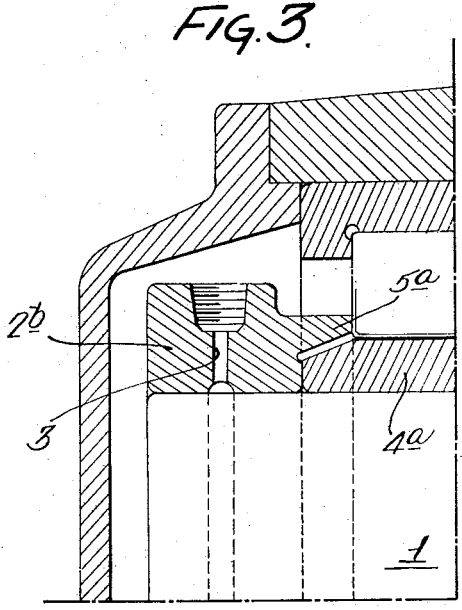

On an axle 1 is mounted a shrink-ring 2 provided with a channel 3 for admitting pressure medium. Between the inner race ring 4 of the roller bearing and the shrink-ring 2 is a loose guide ring 5. In Fig. 2 the shrink-ring 2a has been extended in such a manner that the loose guide ring can be dispensed with. In Fig. 3 the shrink-ring 2b is provided with an extension 5a projecting over the end of the inner race ring corresponding to a common type of guide ring used with cylindrical bearings.

Figure 4:
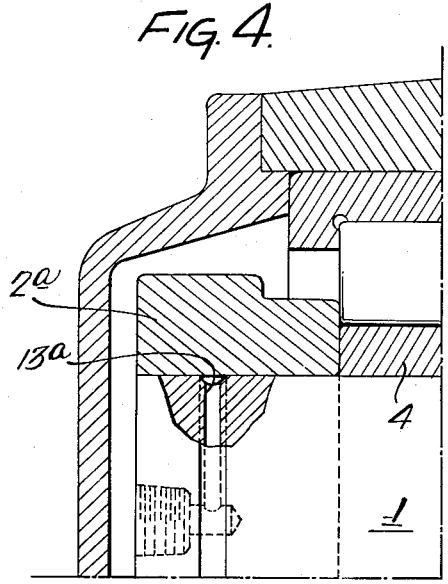

The channel for the introduction of the pressure medium can be provided in the shaft, as shown at 13a in Fig. 4.

Figure 5:
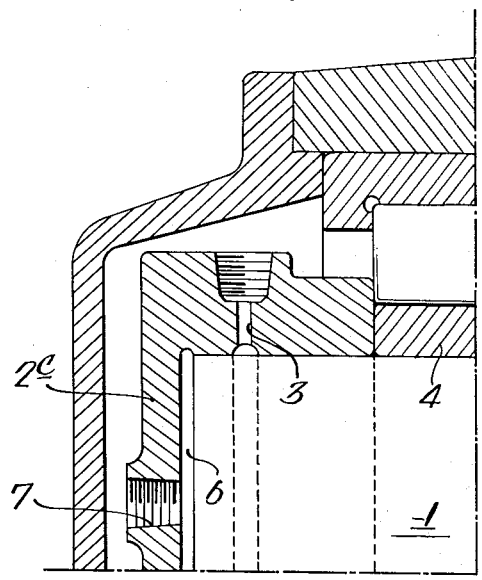

According to Fig. 5, the shrink-ring 2c is shaped so that a pressure chamber 6 is formed between the end of the shaft and the shrink-ring. If pressure fluid, e. g. oil, is introduced in a known manner through the channel 3 at a pressure sufficient to form an oil film between the contacting surfaces and relieve the metallic contact between the surfaces completely or to a large extent the ring 2c can be removed by forcing into the chamber 6 through an opening 7 pressure fluid of comparatively low pressure.

Figure 6:
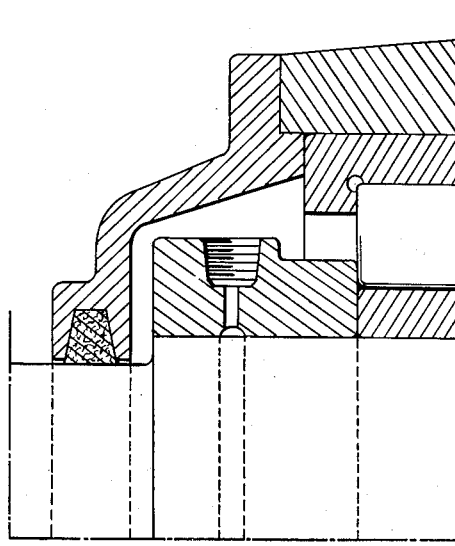

Fig. 6 shows a form of the invention as applied to a through shaft.

It should be pointed out that in all cases the shaft can be made plain and need not be specially finished for the shrink-ring.

The fixing means according to the invention is especially suitable for use in rolling bearing axle boxes.

I claim:

1. The method of axially fixing rolling bearings on a shaft by means of a shrink-ring which comprises expanding the ring by heat, applying the expanded ring to the shaft, shrinking the ring by cooling, introducing a fluid pressure medium between the ring and the shaft to form a film of said medium between the confronting surfaces of said ring and shaft, and forcibly adjusting the ring axially on said film into bearing fixing position.

2. In combination, a shaft, a rolling bearing on said shaft, said bearing comprising rolling elements and inner and outer radially spaced raceways for said elements, a shrink-ring frictionally anchored to the shaft and comprising guide means for the rolling elements of said bearing, and means for introducing a film of pressure fluid between the frictionally engaged surfaces of the ring and shaft.

3. The combination according to claim 2 wherein the shrink-ring embraces an end of the shaft, and including means also for introducing pressure fluid between the ring and said shaft end so as to exert pressure tending to displace the ring axially from the said shaft end.

4. In combination, a shaft, a rolling bearing on said shaft, a shrink-ring frictionally anchored to the shaft and constituting an axial abutment for said bearing, and means for introducing a film of pressure fluid between the frictionally engaged surfaces of the ring and shaft to afford axial displacements of the ring on the shaft without heat expansion of said ring.

References Cited in the file of this patent

UNITED STATES PATENTS

| | | |
|---|---|---|
| 961,375 | Seabrook | June 14, 1910 |
| 1,521,974 | Stafford | Jan. 6, 1925 |
| 1,882,231 | Pelkers | Oct. 11, 1932 |
| 2,018,221 | Mueller | Oct. 22, 1935 |
| 2,084,439 | Hamer | June 22, 1937 |
| 2,348,293 | Hamer | May 9, 1944 |